(12) United States Patent
Sowell et al.

(10) Patent No.: US 7,934,318 B2
(45) Date of Patent: May 3, 2011

(54) MULTIPURPOSE HEDGE TRIMMER DEFLECTOR

(75) Inventors: Lee Sowell, Pelzer, SC (US); Jesse John Jerabek, Anderson, SC (US)

(73) Assignee: Techtronic Outdoor Products Technology Limited, Hamilton (BM)

( * ) Notice: Subject to any disclaimer, the term of this patent is extended or adjusted under 35 U.S.C. 154(b) by 336 days.

(21) Appl. No.: 12/077,842

(22) Filed: Mar. 21, 2008

(65) Prior Publication Data

US 2009/0235536 A1  Sep. 24, 2009

(51) Int. Cl.
*B26B 19/48* (2006.01)

(52) U.S. Cl. .............................. 30/132; 30/124; 30/131

(58) Field of Classification Search .................. 30/124, 30/131, 132, 133, 286, 296.1, 298.4
See application file for complete search history.

(56) References Cited

U.S. PATENT DOCUMENTS

| | | | | |
|---|---|---|---|---|
| 600,650 A | * | 3/1898 | Powell | 33/485 |
| 2,281,189 A | * | 4/1942 | Wright | 30/132 |
| 2,337,285 A | * | 12/1943 | Widdowson | 56/1 |
| 2,510,311 A | | 6/1950 | Greene | |
| 2,747,276 A | * | 5/1956 | Yatsko | 30/132 |
| 3,073,025 A | | 1/1963 | Yatsko | |
| 3,552,013 A | | 1/1971 | Stone | |
| 3,711,946 A | * | 1/1973 | Troutman | 30/388 |
| 3,795,050 A | | 3/1974 | Latsha | |
| 3,916,521 A | | 11/1975 | Sekelsky | |
| 4,071,951 A | | 2/1978 | Burns | |
| 4,127,938 A | | 12/1978 | Slingerland, Jr. | |
| 4,428,124 A | * | 1/1984 | Asakura | 33/334 |
| 5,035,054 A | * | 7/1991 | Ellenberger | 30/233 |
| 5,048,277 A | | 9/1991 | Trimarco et al. | |
| D335,247 S | | 5/1993 | Gittery | |
| 5,383,274 A | * | 1/1995 | Miller | 30/134 |
| 5,640,771 A | | 6/1997 | Guerrucci | |
| 5,653,029 A | | 8/1997 | Shigenaka | |
| 5,659,958 A | | 8/1997 | Goings | |
| 6,651,343 B2 | | 11/2003 | Laren et al. | |
| D488,687 S | | 4/2004 | Maeda | |
| 2009/0277014 A1 | * | 11/2009 | Sergyeyenko | 30/132 |

FOREIGN PATENT DOCUMENTS

FR  2 765 452 A1 * 1/1999

* cited by examiner

*Primary Examiner* — Hwei-Siu C Payer
(74) *Attorney, Agent, or Firm* — Michael Best & Friedrich LLP

(57) ABSTRACT

A multipurpose debris deflector for a hedge trimmer having a deflector body removably attachable to a hedge trimmer. The deflector is positionable between a first position and second wherein in a first position, the deflector body is operable to receive at least a portion of a cutting assembly of the hedge trimmer within the deflector body, and, in a second position, the deflector body is connectable with the cutting assembly such that cutting blades of the cutting assembly are exposed and the deflector body is operable to deflect debris from a vegetation cutting operation.

24 Claims, 4 Drawing Sheets

MULTIPURPOSE HEDGE TRIMMER DEFLECTOR

BACKGROUND

1. Technical Field

This invention relates generally to power-driven, hand-held, hedge trimmers and, more particularly, to a multi-function debris deflector for use with hedge trimmers.

2. Background Information

Hand-held, power driven hedge trimmers having an extended cutting blade portion are well known. A common hedge trimmer is an electrically powered hedge trimmer provided with an extension cord that is readily plugged into a household electrical socket. The basic structure of such device is designed to reduce the weight and provide a balanced and comfortable grip by a user operating the same to cut or sculpt vegetation such as bushes or hedges. Basically, therefore, hedge trimmers of the sort to which this invention relates are intended to be light, versatile pieces of hand-held equipment operable in a variety of orientations and capable of trimming vegetation without unduly tiring out a user.

The trimming operation, however, produces vegetation debris. During the cutting operation, the debris can be propelled toward and strike the user. Further, where trimming is being performed overhead, debris can fall onto the user during the cutting operation. Also, the debris can undesirably fall into the vegetation being trimmed or can scatter onto a lawn or other surface. The debris may then require a separate and time consuming cleaning step.

BRIEF SUMMARY

In one embodiment of the present invention a debris deflector for a hedge trimmer comprises a deflector body removably attachable to a hedge trimmer and positionable between a first position and second position. In a first position, the deflector body is operable to receive at least a portion of a cutting assembly of the hedge trimmer within the deflector body. In a second position, the deflector body is connectable with the cutting assembly such that cutting blades of the cutting assembly are exposed and the deflector body is operable to deflect debris from vegetation during a cutting operation going left to right or right to left.

In another embodiment of the present invention, a hedge trimmer has a pivotable debris deflector. The hedge trimmer comprises a housing having at least one handle for manipulating the hedge trimmer. The hedge trimmer also comprises a cutting assembly having vegetation cutting blades. The hedge trimmer also has a deflector body pivotally connectable to the cutting assembly wherein the deflector body is operable to be moved between a first orientation and a second orientation without requiring removal of the deflector body from the cutting assembly.

In yet another embodiment of the present invention, a hedge trimmer for deflecting vegetation is disclosed. The hedge trimmer has a housing having at least one handle for manipulating the hedge trimmer. The hedge trimmer also has a cutting assembly having a reciprocating cutting blade and a stationary cutting blade. The hedge trimmer further has a housing guard positioned between the handle and the cutting assembly, the housing guard defining a housing side distal from the cutting blades and a cutting assembly side proximal to the cutting blades. Additionally, the hedge trimmer has a deflector body removably attachable to a hedge trimmer and positionable between a first position and second wherein in a first position, the deflector body is operable to receive at least a portion of a cutting assembly of the hedge trimmer within the deflector body, and, in a second position, the deflector body is connectable with the cutting assembly such that cutting blades of the cutting assembly are exposed and the deflector body is operable to deflect debris from vegetation during a cutting operation going left to right or right to left.

Advantages of the present invention will become more apparent to those skilled in the art from the following description of the preferred embodiments of the invention which have been shown and described by way of illustration. As will be realized, the invention is capable of other and different embodiments, and its details are capable of modification in various respects. Accordingly, the drawings and description are to be regarded as illustrative in nature and not as restrictive.

DETAILED DESCRIPTION OF THE DRAWINGS AND THE PRESENTLY PREFERRED EMBODIMENTS

Figure 1A:
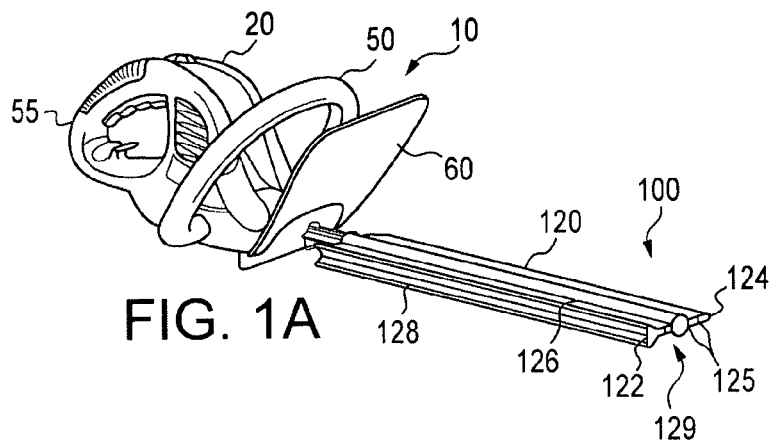
FIGS. 1A-1D are perspective views of a hedge trimmer and multipurpose deflector panel in various configurations according to one embodiment of the present invention.
Figure 1B:
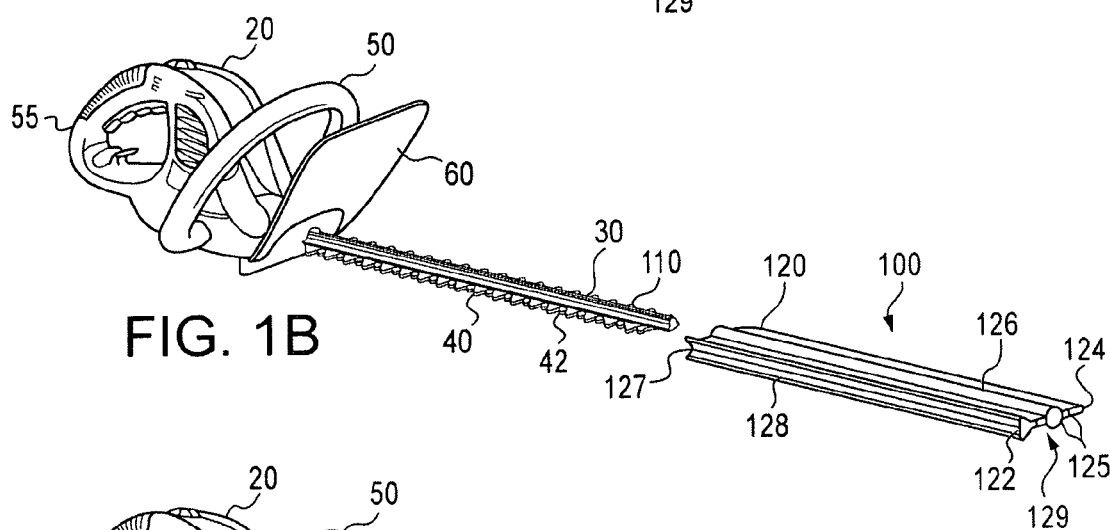
Figure 1C:
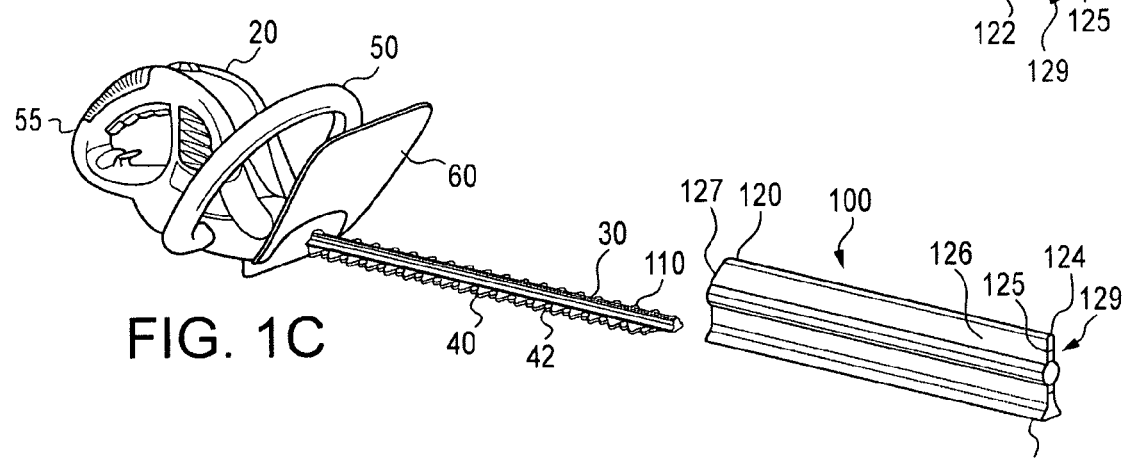
Figure 1D:
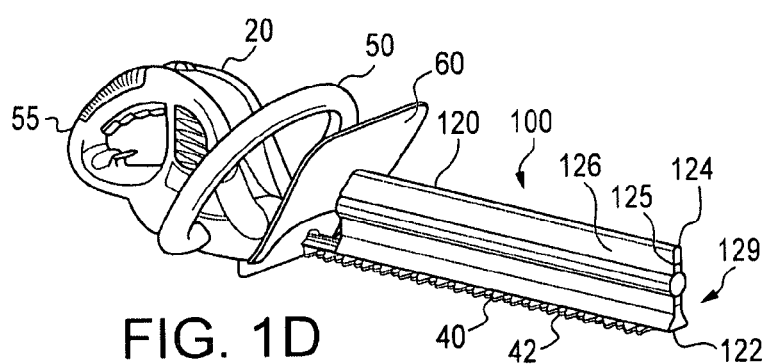

Referring to FIGS. 1A-1D, there is shown a perspective view of a hedge trimmer 10 used with the multipurpose deflector 100 of the present invention. Although the present invention will be described with reference to the exemplary embodiments shown in the drawings, it should be understood that the present invention can be embodied in many alternate forms of embodiments.

The hedge trimmer 10 generally comprises a housing 20, a cutting assembly 30 comprising a stationary cutting blade 40 and a reciprocating cutting blade 42, a first handle 50, a second handle 55 and a housing guard 60. However, in alternate embodiments, the hedge trimmer 10 could include additional or alternate components than those described herein.

The housing 20 typically contains an electrical motor (not shown) that may be battery powered or corded. Other motors, such as internal combustion engines may also be used. The motor is connected with the reciprocating cutting blade 42 of the cutting assembly 30 such that, when activated, the motor causes the reciprocating cutting blade 42 to move axially in a reciprocating manner. The stationary cutting blade 40 of the cutting assembly 30 is typically connected with the housing 20 such that the stationary cutting blade 40 extends away from the housing 20. The reciprocating cutting blade 42 and stationary cutting blade 40 are in close engagement such that vegetation caught between the reciprocating and stationary blades are sheared, or cut, as the hedge trimmer 10 is manipulated. The stationary cutting blade 40 is thus stationary with respect to the motion of the reciprocating cutting blade 42.

The hedge trimmer 10 also typically has a forward handle 50 and a rear handle 55 to allow a user to conveniently manipulate the hedge trimmer 10 during a cutting operation. The hedge trimmer further typically contains a housing guard 60 that is positioned between the housing 20 and the cutting assembly 30 to protect the user's hands, located on the housing side of the housing guard 60, from the cutting blades, located on the opposite side of the housing guard, and to serve as a deflector to prevent vegetation debris from collecting on the housing 20.

The multipurpose deflector 100 of the present invention may be used with the hedge trimmer 10. In one embodiment, the multipurpose deflector 100 includes a deflector support 110 and a deflector body 120. The deflector support 110 provides an interface between the deflector body 120 and the hedge trimmer 10 when the hedge trimmer 10 is performing a cutting operation. The deflector support 110 may be fixedly connected with the stationary cutting blade 40 of the cutting assembly 30, may be formed integrally with the stationary cutting blade 40 or may be connected with the cutting assembly 30 in another manner that ensures the connection will be maintained during normal use. In one embodiment, the deflector support 110 projects from a top surface of the stationary cutting blade 40 and extends substantially along the entire length of the stationary cutting blade 40. In the embodiment shown in FIG. 2, the cross-sectional profile of the deflector support 110 is generally "t" shaped wherein the deflector support 110 contains a center rib 112 having two lateral projections 114. One skilled on the art, however, will understand in light of the disclosure below that other profiles and structures may also be used.

The deflector body 120 of the multipurpose deflector 100 is an elongated structure that is capable of deflecting vegetation debris as the hedge trimmer 10 is used to cut vegetation. In this regard, the deflector 100 partially shields the user from debris projected by the trimmer 10 during operation. Further, in overhead trimming, the deflector 100 can minimize debris from falling onto a user. The deflector 100 may also function as a debris collector wherein vegetation debris can fall against the deflector, and thus be prevented from undesirably being deposited onto, or into, the vegetation being trimmed, or onto a lawn. Debris that has collected against the deflector 100 can be disposed of remotely from the vegetation being cut.

Figure 2:
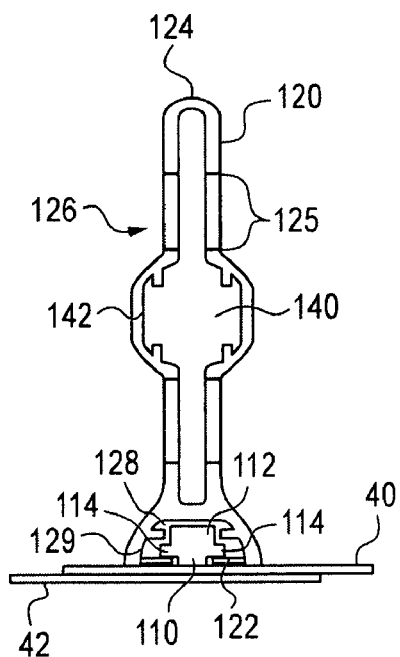
FIG. 2 is a cross-sectional view of a hedge trimmer and multipurpose deflector panel according to one embodiment of the present invention.

In the embodiment shown in FIGS. 1A-1D and FIG. 2, the deflector body 120 defines at least a first edge 122 and second edge 124 and a generally planar center section 126. In the embodiment of FIG. 2, the deflector body 120 has a generally rectangular cross-sectional profile; however, other cross-sectional profiles may also be used such as biconvex, biconcave, trapezoidal, "I-beam" shaped, or "C" shaped, as well as other cross-sectional profiles that allow the deflector body 120 to deflect and/or collect vegetation debris. The deflector body 120 is preferably made of a light weight, durable polymer material; however, one skilled in the art would recognize other suitable materials may also be used.

The first edge 122 of the deflector body 120 is operable to removably attach the deflector body 120 to the hedge trimmer 10. In the embodiment shown in FIG. 2, the first edge 122 defines a longitudinally extending channel 128 that defines approximately the same cross-sectional profile as the deflector body deflector support 110. In this way, the deflector body 120 can be attached to the hedge trimmer 10 by inserting the deflector support 110 into the channel 128 of the deflector body 120 such that the internal surfaces 129 of the channel 128 engage the center rib 112 and the two lateral projections 114. In this configuration, the interface between the deflector body 120 and the deflector support 110 prevents rotation of the deflector body 120 relative to the hedge trimmer 10 during the cutting operation. One skilled in the art will understand that the projection and channel configuration of the deflector body 120 and deflector support 110 may also be reversed such that the deflector body 120 has, for example, a "t" shaped projection and the deflector support 110 has a corresponding "t" shaped channel. One of ordinary skill in the art will also understand that other interfacing profiles, such as a corresponding oval or trapezoidal profiles, may be used, and other attachment structures, such as a screw attachment, may also be used to removably attach the deflector body 120 to the deflector support 110.

The deflector body 120 also defines an opening 140 operable to receive the cutting assembly 30 within the opening 140. In the embodiment of FIG. 2, the opening 140 extends along the longitudinal axis of the deflector body 120. In this embodiment, the cross-sectional profile of the opening 140 is approximately the shape of the cross-sectional profile of the cutting assembly 30. The opening, however, need not be so approximately shaped and need only be large enough to accommodate the blades of the cutting assembly 30. The opening 140 is also operable to accommodate the deflector support 110 attached to the stationary cutting blade 40. In the embodiment of FIG. 2, the cutting assembly 30 and stationary cutting blade 40 are received into the opening 140 and the deflector body 120 is thus placed over the cutting assembly such that user can be protected from the cutting blades of the cutting assembly 30 and the cutting assembly can be protected from damage during storage or transportation of the hedge trimmer 10. A channel 142 within the opening 140 may be configured similarly to channel 128 of the first end 122 of the deflector body 120. In this way, the channel 142 can engage the deflector support 110 to further secure the deflector body 120 to the hedge trimmer 10 during storage and transportation.

In operation of the embodiment of FIGS. 1A-1D and 2, the deflector body can thus be removably attached to be positioned in a first position and a second position. In the first position, the cutting assembly 30 is received within the opening 140 of the deflector body 120 such that the deflector body covers at least a portion of the blades of the cutting assembly 30 to protect the user from harmful contact and to protect the cutting assembly from damage during storage or transportation. When the hedge trimmer 10 is ready for use, the deflector body 120 is removed from the cutting assemble and reoriented approximately 90° so that the first edge 122 is proximal to the deflector support 110. The deflector body 120 is then removably attached to the deflector support 110 by inserting the deflector support 110 into the channel 128 of the deflector body 120.

In this embodiment, the deflector body 120 is substantially perpendicular to the cutting blade 40. A perpendicular orientation allows a user bidirectional cutting with the hedge trimmer 10 to achieve desired deflection of vegetation debris in both cut directions. The hedge trimmer is bidirectional in that the trimmer deflector portion allows the trimmer to cut when moving from right to left or vice-versa without having to remove the deflector body 120 from the deflector support 110 and reattach it to the deflector support 110. In other embodiments, the deflector body 120 may be fixed at other desired angles.

The deflector body 120 may also have visual indicia 125 on a third edge 127 and/or a fourth edge 129 of the deflector body 120 to indicate the depth of cut the user is making. The visual indicia 125 may include numeric, symbolic or color-coded indicia visible on an edge 127, 129 of the deflector body 120 to be visible to the user during the cutting operation so that the used may gage the depth into vegetation of the cut. As shown in FIG. 2, visual indicia 125 are shown as lines on the deflector body and can be positioned at set distances.

Figure 3:
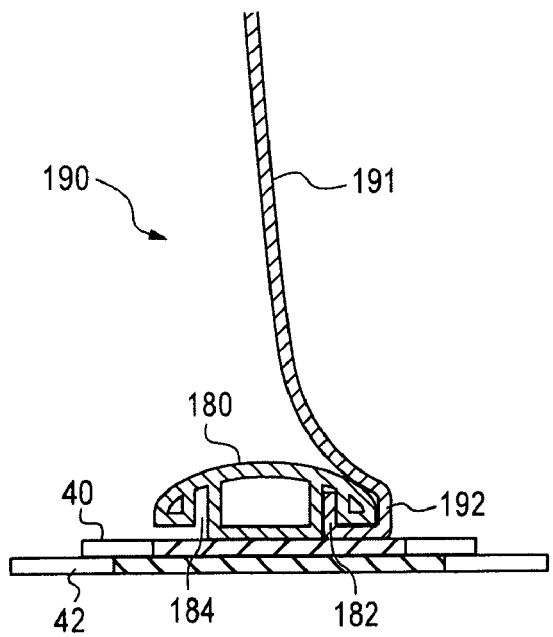
FIG. 3 is a cross-sectional view of a hedge trimmer and multipurpose deflector panel according to one embodiment of the present invention.
Figure 4:
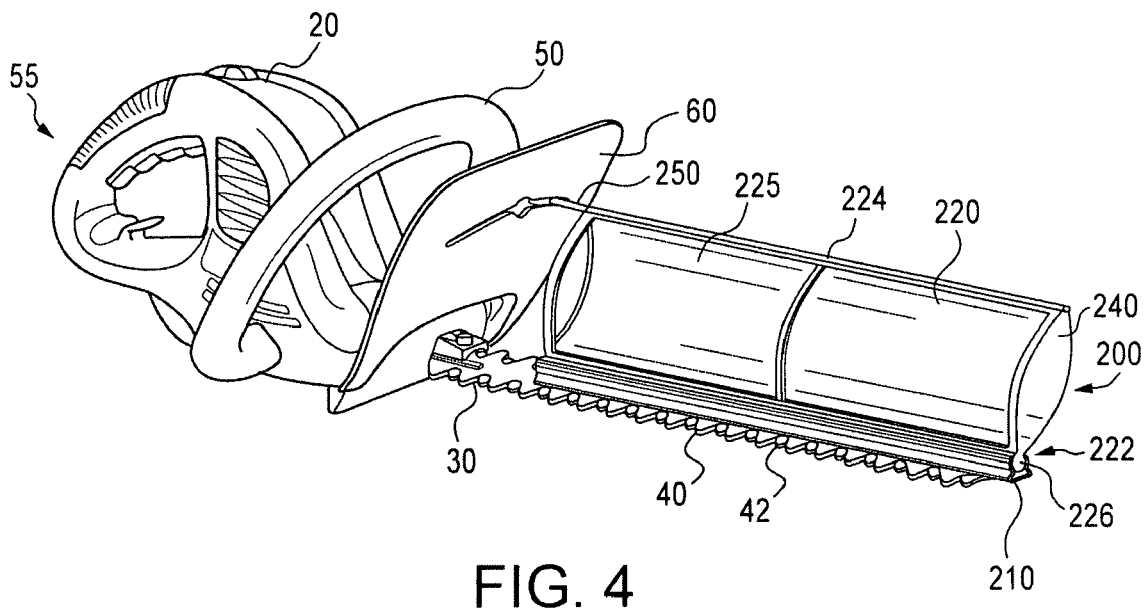
FIG. 4 is a perspective view of a hedge trimmer and multipurpose deflector panel according to one embodiment of the present invention.
Figure 5:
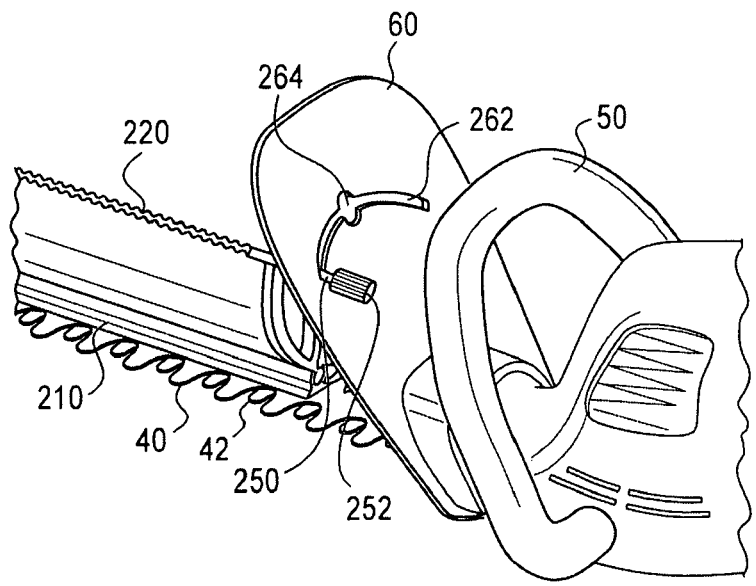
FIG. 5 is a perspective view of a hedge trimmer and multipurpose deflector panel according to one embodiment of the present invention.

With reference to FIG. 3, another multipurpose deflector 190 is shown. In this embodiment, the deflector body 191 can be made of a single piece extruded polymer having a folded first end 192. The cross-section of the deflector body 191 can define a generally curved profile. This generally curved profile can promote the collection of vegetation debris during the cutting process. The deflector support 180 has a first channel 182 and a second channel 184 operable to accommodate the first end 192 of the deflector body 191 such that the deflector body 191 can slide axially relative to the hedge trimmer housing 20 and thus be removably attached to the hedge trimmer 10. In this embodiment, the user may position the deflector body 191 in a desired orientation according to the direction of cutting by inserting the deflector body 191 in either the first channel 182 or second channel 184 of the deflector support 180.

Figure 6A:
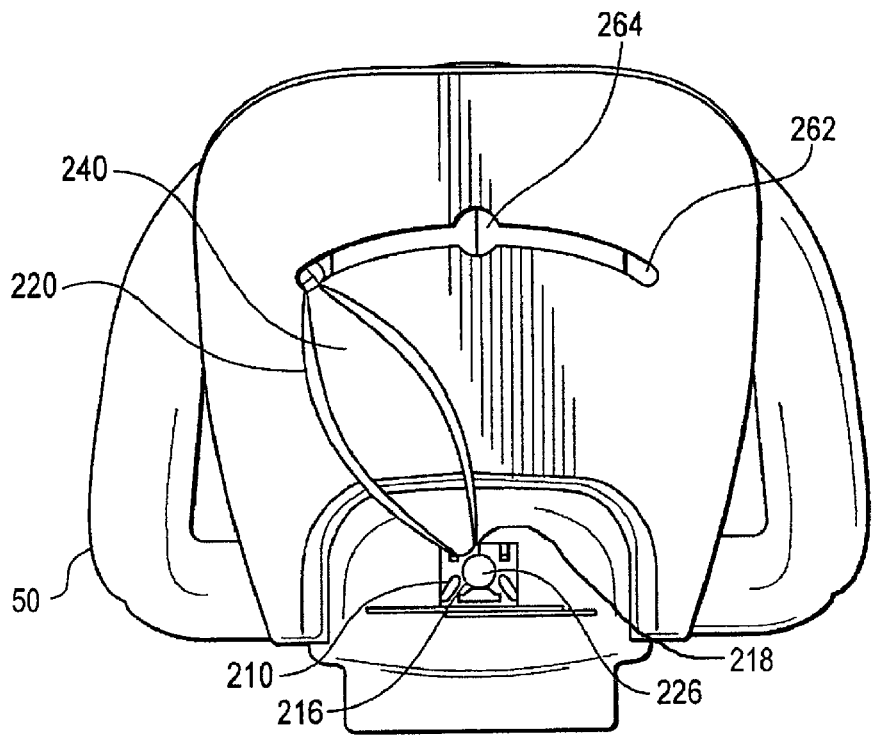
FIGS. 6A-6B are end views of a hedge trimmer and multipurpose deflector panel in different orientations according to one embodiment of the present invention.
Figure 6B:
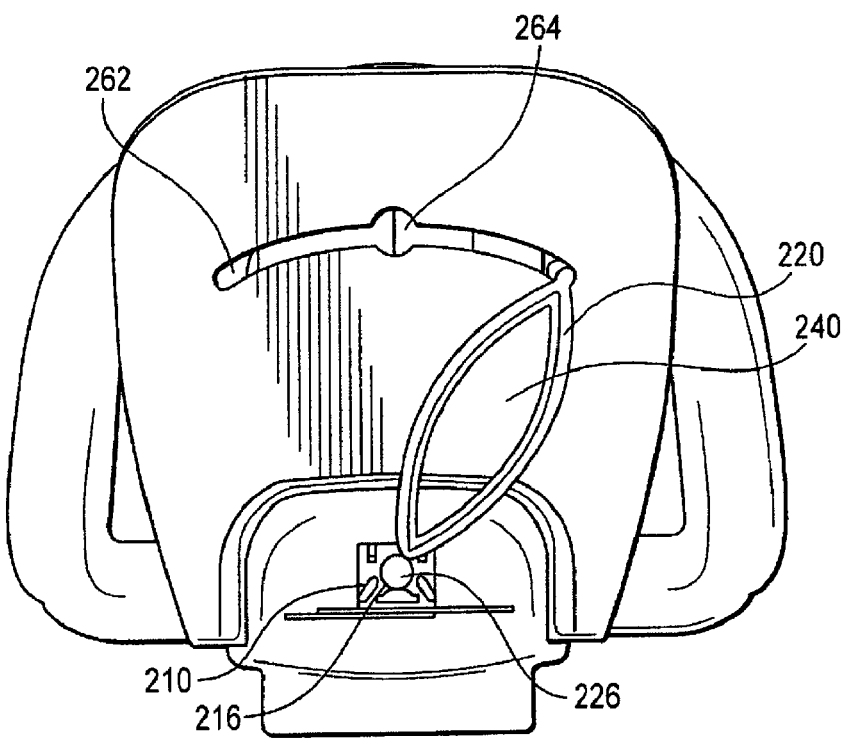

With reference to FIGS. 4-6B, another embodiment of the deflector body is shown. In this embodiment, a pivoting multipurpose deflector 200 is operable to conveniently change the orientation between a deflector support 210 and a deflector body 220 during a cutting operation. Similar to the above disclosed embodiment, the hedge trimmer 10 generally comprises a housing 20, a cutting assembly 30 comprising a stationary cutting blade 40 and a reciprocating cutting blade 42, a first handle 50, a second handle 55 and a housing guard 60. Also similar to above disclosed embodiment, the deflector support 210 may also be connected with the stationary cutting blade 40 of the cutting assembly, may be integral with the stationary cutting blade 40 or may be connected with the cutting assembly 30 in another manner. In this embodiment, however, the interface between the deflector support 210 and the deflector body 220 allows for pivotal movement of the deflector body 220 so that the deflector body 220 may be reoriented at various angles during a cutting operation. For example, when cutting vegetation in a first direction, the user may desire to orient the deflector body at a first angle relative to the cutting assembly, as depicted in FIG. 6A. When cutting vegetation in a second, opposite direction, the deflector body may be reoriented to a second angle relative to a cutting assembly, as depicted in FIG. 6B. In this manner, the deflector body 220 can better act as a debris collector when cutting vegetation to prevent debris from falling into the vegetation. The debris can be collected by the deflector body 220 when cutting in a first direction. After a cutting operation is complete, the user may dispose of the collected debris a location remote from the vegetation. If the user desires to cut the vegetation in a second direction, the deflector body 220 may be reoriented to accommodate collection of debris when cutting in the second direction.

In the embodiment of FIGS. 4-6B, the deflector support 210 has a substantially cylindrical channel 216 and defines an arcuate opening 218 to the substantially cylindrical channel 216. The deflector body 220 contains a first edge 222, a second edge 224 and a center section 225. The first edge 222 defines a substantially cylindrical projection 226 that engages the substantially cylindrical channel 216 of the deflector support 210. In this manner, the substantially cylindrical projection 226 can be inserted into the substantially cylindrical channel 216 and the deflector body 220 can extend through the arcuate opening 218 to the substantially cylindrical channel 216. The substantially cylindrical projection 226 thus acts as a pivot point within the substantially cylindrical channel 216 to allow pivotal motion of the deflector body 220. One skilled in the art would know additional methods for allowing a pivotal connection between the deflection body 220 and the hedge trimmer 10 including, for example, the use of a hinge.

The pivoting multipurpose deflector 200 also has a pivot actuator 250 to promote convenient and safe movement of the deflector body 210 during a cutting operation. In the embodiment of FIGS. 4-6B, the pivot actuator 250 is connected to the deflector body 210 and extends through an arcuate guide slot 262 in the housing guard 60 so that pivot actuator 250 may be manipulated from the housing 20 side of the housing guard 60 to protect a user from injury from the cutting blades during a cutting operation. In one embodiment, the pivot actuator 250 has an enlarged end 252 to allow convenient manipulation of the pivot actuator 250 by the user. In this embodiment, an enlarged end 252 sufficiently larger than the width of the arcuate guide slot 262 will prevent the pivot actuator 250 from moving axially away from the housing 20 and thus prevent axial motion of the deflector body 220.

A user may manipulate the pivot actuator 250 to orient the deflector body in a first orientation during cutting in a first direction. The user may then move the pivot actuator 250 within the arcuate guide slot 262 to orient the deflector body in a second orientation during cutting in a second direction.

In another embodiment, the pivoting multipurpose deflector 200 may be removably attached with the hedge trimmer 10 such that it can be placed over the cutting assembly 30 to protect the user from the cutting blades of the cutting assembly 30 and protect the cutting assembly 30 from damage during storage or transportation of the hedge trimmer 10. In this embodiment, the deflector body 220 defines an opening 240 operable to receive the cutting assembly 30 within the opening 240. In the embodiment of FIG. 6B, the opening 240 extends along the longitudinal axis of the deflector body 220. In this embodiment the opening 240 is large enough to accommodate the blades of the cutting assembly 30. The opening 240 is also operable to accommodate the deflector support 210 attached to the stationary cutting blade 40. As with the embodiment of FIG. 2, the opening 240 may also be operable to engage the deflector support 210 to further secure the deflector body 220 to the hedge trimmer 10.

With reference to FIGS. 4-6B, when the hedge trimmer 10 is ready to be stored or transported, the deflector body 220 may be removed from the hedge trimmer 10 by sliding the deflector body 220 axially away from the housing 20. The pivot actuator 250 may be required to be aligned with an access opening 264 in the arcuate guide slot 262 to permit axial motion of the deflector body 220. The deflector body 220 is then removed from the cutting assembly 30 and repositioned approximately 90° so that the cutting assembly 30 and deflector support 210 can be received into the opening 240 of the deflector body 220, and the deflector body 220 can thus be placed over the cutting assembly such that user can be protected from the cutting blades of the cutting assembly 30 and the cutting assembly 30 can be protected from damage during storage or transportation of the hedge trimmer 10.

It is therefore intended that the foregoing detailed description be regarded as illustrative rather than limiting, and that it be understood that it is the following claims, including all equivalents, that are intended to define the spirit and scope of this invention.

The invention claimed is:

1. A debris deflector for a hedge trimmer including a cutting assembly having cutting blades, the cutting blades having a top surface and a bottom surface, the debris deflector comprising:

a deflector body removably attachable to the hedge trimmer and positionable in a first position and in a second position, the deflector body defining an opening extending along a longitudinal axis of the deflector body, wherein, in the first position, the deflector body is operable to receive at least a portion of the cutting assembly within the opening such that the top surface and the bottom surface of the cutting blades are enclosed by and protectably surrounded by the deflector body, and, in the second position, the deflector body is connectable with the cutting assembly such that the cutting blades of the cutting assembly are exposed and the deflector body is operable to deflect debris from vegetation during a cutting operation going left to right and going right to left.

2. The debris deflector of claim 1 wherein the opening is formed at an edge of the deflector body for receiving the cutting assembly when the deflector body is in the first position.

3. The debris deflector of claim 1 further comprising a deflector support configured to couple to the cutting assembly, wherein the deflector support engages an edge of the deflector body when the deflector body is in the second position to secure the deflector body in the second position.

4. The debris deflector of claim 3 wherein the deflector body defines a channel within the opening and the deflector support includes a projection, and wherein the channel engages the projection for securing the deflector body to the cutting assembly in the first position.

5. The debris deflector of claim 4, wherein the projection is a "t" shaped projection having two lateral projections, and wherein the channel is a "t" shaped channel that engages the "t" shaped projection for securing the deflector body in the first position.

6. The debris deflector of claim 3 wherein the deflector support is removably attached to the cutting assembly.

7. The debris deflector of claim 3, wherein the deflector support is configured to extend along a length of the cutting assembly.

8. The debris deflector of claim 1 wherein the deflector body is substantially perpendicular to the cutting assembly when the deflector body is in the second position.

9. The debris deflector of claim 1 further comprising visual indicia to a user to indicate the depth of a cutting operation when the deflector body is in the second position.

10. A hedge trimmer for trimming vegetation, the hedge trimmer comprising:
a housing having at least one handle for manipulating the hedge trimmer;
a cutting assembly having a reciprocating cutting blade and a stationary cutting blade, the reciprocating cutting blade and the stationary cutting blade each including a top surface and a bottom surface;
a housing guard positioned between the handle and the cutting assembly, the housing guard defining a housing side distal from the cutting blades and a cutting assembly side proximal to the cutting blades; and
a deflector body removably attachable to the hedge trimmer and positionable in a first position and in a second position, the deflector body defining an opening extending along a longitudinal axis of the deflector body,
wherein, in the first position, the deflector body is operable to receive at least a portion of the cutting assembly within the opening such that the top surfaces and the bottom surfaces of reciprocating cutting blade and the stationary cutting blade are enclosed by and protectably surrounded by the deflector body, and, in the second position, the deflector body is connectable with the cutting assembly such that the reciprocating cutting blade and the stationary cutting blade are exposed and the deflector body is operable to deflect debris from vegetation during a cutting operation going left to right and going right to left.

11. The hedge trimmer of claim 10 wherein the deflector body is pivotally connectable to the cutting assembly and the deflector body is operable to be moved between a first orientation and a second orientation while in the first position without requiring removal of the deflector body from the cutting assembly.

12. The hedge trimmer of claim 11 further comprising a pivot actuator connected with the deflector body, the pivot actuator having an end extending to the housing side of the housing guard wherein a user can manipulate the end of the pivot actuator to move the deflector body from the first orientation to the second orientation.

13. The hedge trimmer of claim 12 wherein the housing guard defines an arcuate slot through which the pivot actuator extends.

14. The hedge trimmer of claim 10 further comprising a deflector support coupled to the cutting assembly, wherein the deflector support engages an edge of the deflector body to secure the deflector body in the second position.

15. The hedge trimmer of claim 14, wherein the deflector support extends along a length of the cutting assembly.

16. The hedge trimmer of claim 15, wherein the deflector body is removable from the hedge trimmer by sliding the deflector body away from the housing along the deflector support.

17. The hedge trimmer of claim 14, wherein the deflector body defines a channel within the opening and the deflector support includes a projection, and wherein the channel engages the projection for securing the deflector body to the cutting assembly in the first position.

18. The hedge trimmer of claim 14, wherein the edge of the deflector body defines a channel and the deflector support includes a projection, and wherein the channel engages the projection for securing the deflector body to the cutting assembly in the second position.

19. A debris deflector for a hedge trimmer including a cutting assembly having cutting blades, the debris deflector comprising:
a deflector body removably attachable to the hedge trimmer and positionable in a first position and in a second position, the deflector body defining an opening extending along a longitudinal axis of the deflector body,
wherein, in the first position, the deflector body is operable to receive at least a portion of the cutting assembly within the opening such that the cutting blades are enclosed by the deflector body, and, in the second position, the deflector body is connectable with the cutting assembly such that the cutting blades of the cutting assembly are exposed and the deflector body is operable to deflect debris from vegetation during a cutting operation going left to right and going right to left, the debris deflector further comprising,
a deflector support configured to couple to the cutting assembly, wherein the deflector support engages an edge of the deflector body when the deflector body is in the second position to secure the deflector body in the second position,
wherein the edge of the deflector body defines a channel and the deflector support includes a projection, and wherein the channel engages the projection for securing the deflector body to the cutting assembly in the second position.

20. The debris deflector of claim 19 wherein the opening is formed at an edge of the deflector body for receiving the cutting assembly when the deflector body is in the first position.

21. The debris deflector of claim 19 wherein the deflector body defines a channel within the opening and the deflector support includes a projection, and wherein the channel engages the projection for securing the deflector body to the cutting assembly in the first position.

22. The debris deflector of claim 21 wherein the deflector support is removably attached to the cutting assembly.

23. The debris deflector of claim 21 wherein the deflector body is substantially perpendicular to the cutting assembly when the deflector body is in the second position.

24. The debris deflector of claim 21 further comprising visual indicia to a user to indicate the depth of a cutting operation when the deflector body is in the second position.

* * * * *